US009143550B2

(12) United States Patent
Mandyam

(10) Patent No.: US 9,143,550 B2
(45) Date of Patent: Sep. 22, 2015

(54) GRACEFUL DEGRADATION OF WEBSOCKET CONNECTIONS TO NONPERSISTENT HTTP-BASED COMMUNICATIONS

(71) Applicant: Qualcomm Innovation Center, Inc., San Diego, CA (US)

(72) Inventor: Giridhar D. Mandyam, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 429 days.

(21) Appl. No.: 13/691,759

(22) Filed: Dec. 1, 2012

(65) Prior Publication Data

US 2014/0156725 A1  Jun. 5, 2014

(51) Int. Cl.
*G06F 15/16* (2006.01)
*G06F 1/32* (2006.01)
*H04L 29/08* (2006.01)
*H04L 29/06* (2006.01)
*H04W 76/02* (2009.01)
*H04W 28/02* (2009.01)

(52) U.S. Cl.
CPC .............. *H04L 67/02* (2013.01); *G06F 1/3212* (2013.01); *H04L 67/145* (2013.01); *H04L 67/148* (2013.01); *H04L 65/1083* (2013.01); *H04W 28/0221* (2013.01); *H04W 76/02* (2013.01); *Y02B 60/12* (2013.01); *Y02B 60/50* (2013.01)

(58) Field of Classification Search
CPC ............ H04L 1/0025; H04L 29/06163; H04L 65/1083; H04L 67/26; H04L 69/18; Y02B 60/10–60/50; H04W 88/06; H04W 76/04–76/048; H04W 28/0215; H04W 28/0221; G06F 1/3206; G06F 1/3212
See application file for complete search history.

(56) References Cited

U.S. PATENT DOCUMENTS

| 7,240,095 | B1 * | 7/2007 | Lewis ........................... 709/206 |
| 7,373,500 | B2 * | 5/2008 | Ramelson et al. ............ 713/150 |
| 8,036,690 | B1 * | 10/2011 | Delker et al. .................. 455/512 |
| 8,326,920 | B1 * | 12/2012 | Modadugu et al. ........... 709/203 |
| 8,417,823 | B2 * | 4/2013 | Luna et al. ..................... 709/227 |
| 8,442,025 | B2 * | 5/2013 | Borsella et al. ............... 370/349 |
| 8,897,952 | B1 * | 11/2014 | Palmer ......................... 701/31.5 |
| 8,903,458 | B1 * | 12/2014 | Ho ................................. 455/572 |
| 8,989,818 | B2 * | 3/2015 | Tal et al. ....................... 455/566 |
| 2002/0057678 | A1 * | 5/2002 | Jiang et al. .................... 370/353 |
| 2003/0084165 | A1 * | 5/2003 | Kjellberg et al. ............. 709/227 |
| 2006/0291455 | A1 * | 12/2006 | Katz et al. ..................... 370/355 |

(Continued)

OTHER PUBLICATIONS

"Tizen Web Runtime," May 2012. (https://download.tizen.org/misc/media/conference2012/tuesday/ballroom-a/2012-05-08_1515-1555-tizen_web_runtime.pdf).*

(Continued)

*Primary Examiner* — David Lazaro
*Assistant Examiner* — Julian Chang
(74) *Attorney, Agent, or Firm* — Neugeboren O'Dowd PC

(57) ABSTRACT

Systems, methods, and apparatus for enabling communications between a client and server are herein disclosed such that a connection between the client and server can be switched from a persistent to a nonpersistent connection. Persistent connections tend to drain battery power and cause other degradations, and thus switching to nonpersistent connections, at least temporarily, can preserve battery power and enable other advantages.

27 Claims, 4 Drawing Sheets

(56) References Cited

U.S. PATENT DOCUMENTS

| | | |
|---|---|---|
| 2007/0149256 A1* | 6/2007 | Burgan et al. ............... 455/574 |
| 2008/0200220 A1* | 8/2008 | Jackson ....................... 455/574 |
| 2009/0037756 A1* | 2/2009 | Lundquist et al. ........... 713/323 |
| 2009/0228594 A1* | 9/2009 | Lotlikar et al. .............. 709/228 |
| 2009/0253444 A1* | 10/2009 | Tian et al. .................... 455/466 |
| 2009/0327390 A1* | 12/2009 | Tran et al. .................... 709/201 |
| 2010/0056173 A1* | 3/2010 | Bloom et al. ............. 455/456.1 |
| 2010/0223456 A1* | 9/2010 | Schneider .................... 713/152 |
| 2010/0281107 A1* | 11/2010 | Fallows et al. ............... 709/203 |
| 2010/0306547 A1* | 12/2010 | Fallows et al. ............... 713/178 |
| 2010/0332600 A1* | 12/2010 | Narayan et al. .............. 709/206 |
| 2011/0125856 A1* | 5/2011 | Chu et al. ..................... 709/206 |
| 2011/0138210 A1* | 6/2011 | Belali et al. ................... 713/323 |
| 2011/0145321 A1* | 6/2011 | Jiang ............................ 709/203 |
| 2011/0182220 A1* | 7/2011 | Black et al. ................... 370/311 |
| 2011/0202646 A1* | 8/2011 | Bhatia et al. .................. 709/223 |
| 2011/0219249 A1* | 9/2011 | Kuwahara ..................... 713/323 |
| 2011/0292975 A1* | 12/2011 | Kuwahara ..................... 375/219 |
| 2012/0036278 A1* | 2/2012 | Rafsky et al. ................. 709/232 |
| 2012/0052814 A1* | 3/2012 | Gerber et al. ............. 455/67.11 |
| 2012/0110173 A1* | 5/2012 | Luna et al. .................... 709/224 |
| 2012/0129564 A1* | 5/2012 | De La Cropte De Chanterac .................... 455/522 |
| 2012/0135726 A1* | 5/2012 | Luna et al. .................. 455/422.1 |
| 2012/0179808 A1* | 7/2012 | Bergkvist et al. ............. 709/223 |
| 2012/0210243 A1* | 8/2012 | Uhma et al. ................... 715/744 |
| 2012/0221877 A1* | 8/2012 | Prabu ............................ 713/340 |
| 2012/0239949 A1* | 9/2012 | Kalyanasundaram et al. ............................. 713/320 |
| 2012/0303774 A1* | 11/2012 | Wilson et al. ................. 709/223 |
| 2012/0303798 A1* | 11/2012 | Crowell et al. ............... 709/224 |
| 2012/0323990 A1* | 12/2012 | Hayworth ..................... 709/203 |
| 2013/0097239 A1* | 4/2013 | Brown et al. ................. 709/204 |
| 2013/0111572 A1* | 5/2013 | Gaddam et al. ................... 726/7 |
| 2013/0115980 A1* | 5/2013 | Papakipos et al. ........... 455/466 |
| 2013/0138983 A1* | 5/2013 | Geary ........................... 713/320 |
| 2013/0156167 A1* | 6/2013 | Talwar et al. .............. 379/88.12 |
| 2013/0165129 A1* | 6/2013 | Koren et al. .................. 455/440 |
| 2013/0190032 A1* | 7/2013 | Li .................................. 455/517 |
| 2013/0210493 A1* | 8/2013 | Tal et al. ....................... 455/566 |
| 2013/0212227 A1* | 8/2013 | Thomas ........................ 709/219 |
| 2013/0236000 A1* | 9/2013 | Qiu et al. ................. 379/265.09 |
| 2013/0254264 A1* | 9/2013 | Hankinson et al. ........... 709/203 |
| 2013/0263017 A1* | 10/2013 | Moyers et al. ................ 715/753 |
| 2014/0012997 A1* | 1/2014 | Erbe .............................. 709/228 |
| 2014/0026025 A1* | 1/2014 | Smith ............................ 715/230 |
| 2014/0068038 A1* | 3/2014 | Brook et al. .................. 709/223 |
| 2014/0101270 A1* | 4/2014 | Woo et al. ..................... 709/206 |
| 2014/0108559 A1* | 4/2014 | Grochowicz et al. ......... 709/206 |
| 2014/0129622 A1* | 5/2014 | Michaeli et al. .............. 709/203 |
| 2014/0129731 A1* | 5/2014 | Copsey et al. ................ 709/233 |
| 2014/0148205 A1* | 5/2014 | Grinshpun et al. ........... 455/466 |
| 2014/0157369 A1* | 6/2014 | Mischook et al. ................ 726/4 |
| 2014/0235257 A1* | 8/2014 | Hannu et al. .................. 455/450 |
| 2014/0362702 A1* | 12/2014 | Luna ............................. 370/235 |

OTHER PUBLICATIONS

Mandyam, Giridhar D., and Navid Ehsan. "Html5 connectivity methods and mobile power consumption." Publicly available as early as Nov. 14, 2012.*

"The System Information API," 2010, W3C. (http://www.w3.org/TR/2010/WD-system-info-api-20100202/).*

Park, Nojoon. "Tizen 1.0," Apr. 2012. (https://source.tizen.org/release/tizen-1.0).*

"Web Socket Protocol Component API—Windows 8 New Technology," Sep. 2012. (https://pcandtablet.com/blog/21/web-socket-protocol-component-api-windows-8-new-technology.html).*

Fette, et al., "The WebSocket Protocol," Internet Engineering Task Force (IETF), RFC 6455, Dec. 2011, pp. 1-71.

Hickson, Ian ed., "The WebSocket API," The World Wide Web Consortium (W3C). W3C Working Draft. May 24, 2012, pp. 1-22.

* cited by examiner

GRACEFUL DEGRADATION OF WEBSOCKET CONNECTIONS TO NONPERSISTENT HTTP-BASED COMMUNICATIONS

BACKGROUND

1. Field

The present disclosure relates generally to client-server communications, and more specifically to switching between persistent and nonpersistent communications between client and server.

2. Background

The web originally used non-persistent methods of client-server communication in which a client would request web content, such as a webpage, and the server would return the content, and the connection between the client and server would close. The server was not able to initiate communication, although some implementations called for the client to periodically poll the server to see if the server had any unrequested data for the client. Early web servers were also known as 'stateless' since they did not store any knowledge regarding a client request or the content returned to the client in response to a request. In other words, once the web server served content, it no longer had any awareness of the client.

As webpages advanced they became more interactive and required lower latency. As a result, persistent communication protocols were developed that established a persistent two-way connection between client and server. These persistent connections were not torn down after the server transmitted data to the client, and also enabled the server to send data without a client request or polling. Instant messaging and VoIP are two examples of implementations where a client and server are both able to initiate data transmission over a persistently-open connection.

The WebSocket specification is one example of a persistent protocol and it defines an API that establishes "socket" connections between a web browser (the client) and a web server (the server). Sockets establish a persistent connection between client and server that stays open until either the client or server closes the connection. Sockets also enable either the client or server to initiate message transmission, thus removing the need for polling.

Despite the advantages of persistent connections, they still 'time-out' or terminate if a certain time period passes without any client or server communication. The WebSocket specification does not provide sufficient means to prevent timing out (also known as keep alive mechanisms). Software developers, therefore, often add their own keep-alive mechanisms to applications in order to keep a connection alive. For instance, many web applications periodically send keep-alive messages to the server in order to prevent the WebSocket from timing out.

Yet, these keep-alive mechanisms also interfere with power saving methods on many mobile devices. In particular, many mobile devices include power saving methods that transition the radio to low power states of operation (e.g., "Fast Dormancy") after a period of radio inactivity. Developer keep-alive messages can be sent so frequently that they prevent these radio transitions and thus sap battery power faster than device manufacturers intended.

There is thus a need in the art for a way to engage in persistent communication that does not retard Fast Dormancy and other mobile device power saving mechanisms.

SUMMARY

Embodiments disclosed herein address the above stated needs by switching between persistent and nonpersistent communication protocols or connections between a client and a server. Some aspects of the invention can be characterized as a method for switching between a persistent communication protocol between a client and a server and a nonpersistent communication protocol between the client and the server. The method can include establishing a persistent connection between the client and the server. The method can further include determining that the server can switch between the persistent and the nonpersistent communication protocols. The method can further include monitoring a battery of the client. When a power level of the battery falls below a first threshold, the method can terminate the persistent connection. The method can then include initiating one or more nonpersistent connections between the client and the server.

Other aspects of the invention can be characterized as a client configured to partake in a communication connection with a server. The client can include a protocol switching checker module, a persistent connection module, a client state monitor, and a nonpersistent connection module. The protocol switching checker module can determine if the server can support, and switch between, persistent and nonpersistent communication protocols. The persistent connection module can establish a persistent connection between the client and the server. The client state monitor can monitor a state of the client and initiates termination of the persistent connection when the state meets a predefined criterion. The nonpersistent connection module can establish at least one nonpersistent connection between the client and the server once the state meets the predefined criterion.

Further aspects of the invention can be characterized as a websocket decision engine of a web runtime engine of a client. The websocket decision engine can include a means for establishing a persistent connection with a server along with a means for monitoring a state of the client. The websocket decision engine can further include a means for terminating the persistent connection when the state of the client meets a predefined criterion. The websocket decision engine can further include a means for replacing the persistent connection with a nonpersistent connection subsequent to the state of the client meeting the predefined criterion.

Yet further aspects of the invention can be characterized as a non-transitory, tangible computer readable storage medium of a server, encoded with processor readable instructions to perform a method for carrying out communication between a client and the server. The method can include receiving a connection request from a client including a query as to whether the server is able to engage in nonpersistent as well as persistent connections. The method can further include returning a response to the client acknowledging that the server can engage in both nonpersistent and persistent connections. The method can yet further include engaging in persistent communication with the client via a persistent connection. The method can yet further include listening for a request for nonpersistent communication from the client once the persistent communication ends. The method also can include receiving the request for nonpersistent communication from the client. Finally, the method can include engaging in nonpersistent communication with the client.

DETAILED DESCRIPTION

Figure 1:
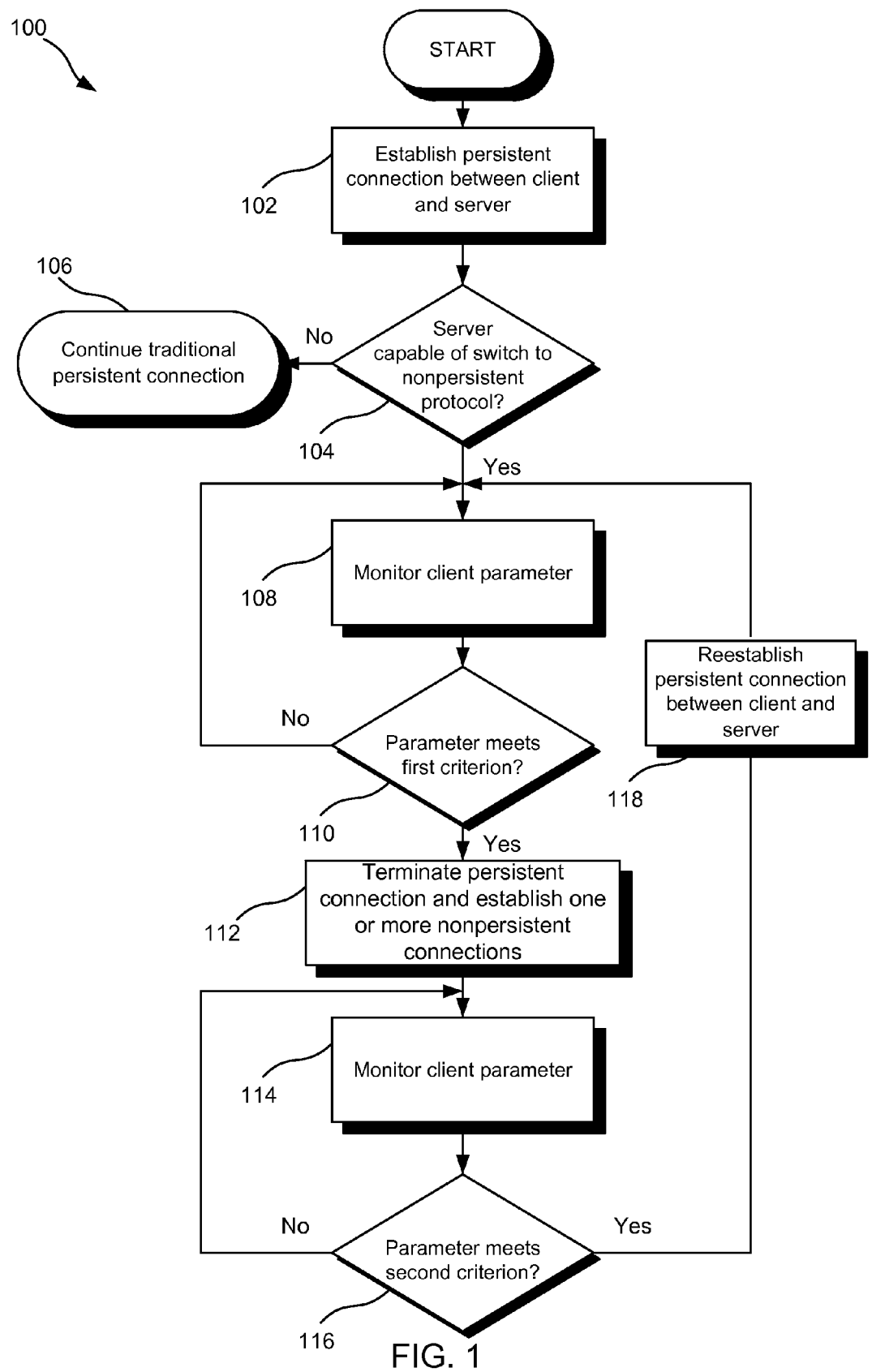
FIG. 1 illustrates a method for client-server communication wherein a persistent or nonpersistent connection can be used.

The word "exemplary" is used herein to mean "serving as an example, instance, or illustration." Any embodiment described herein as "exemplary" is not necessarily to be construed as preferred or advantageous over other embodiments.

For the purposes of this disclosure a "nonpersistent" connection is one in which a connection between a client and server is established and torn down for each client request to the server. Operation of a nonpersistent connection includes establishment of a connection between a client and server, a client request for data sent to the server, a response from the server to the client of the requested data or some associated error message, and a tearing down or termination of the connection. The client can poll the server to see if there is data waiting on the server for the client, and the client can open a nonpersistent connection in order to enable the server to transmit the data. Nonpersistent communication protocols include Asynchronous JavaScript and XML (also known as AJAX) and HTTP/1.0, to name two non-limiting examples.

For the purposes of this disclosure a "persistent" connection is one in which a connection between a client and server is established and messages are sent between client and server until either decides to close the connection or some other force ends the connection. A persistent connection thus enables multiple client requests to the server without the need to open and close multiple connections, and also enables server-initiated transmissions thus eliminating the need for polling. Operation of a persistent connection includes establishment of a connection between a client and server, one or more transmissions of data from client to server and/or server to client, and a tearing down of the connection either initiated by the client or server or due to the expiration of a timeout timer (e.g., due to prolonged inactivity on the connection) or application-specific logic requiring the connection to be torn down. In some cases, the tearing down of the connection can be a "partial tearing down" in which a TCP connection is closed, but a WebSocket object persists in order to more quickly and easily facilitate reestablishment of the persistent connection at a later time. Persistent communication protocols include WebSocket and HTTP/1.1, to name two non-limiting examples.

Nonpersistent connections can also include, but do not require, stateless or connectionless connections. Persistent connections can also include, but do not require, stateful or connection-oriented connections.

For the purposes of this disclosure, AJAX is a development technique for creating interactive web applications. Unlike classic web pages, which must load in their entirety if content changes, AJAX allows web pages to be updated asynchronously (in the background) by exchanging small amounts of data with the server behind the scenes. AJAX is used in GMAIL and GOOGLE MAPS, to name two examples. Connections and communications made possible via AJAX development techniques will herein be referred to as AJAX connections and AJAX communications, respectively.

To overcome the above-noted challenges in the art, systems, methods, and apparatus are herein disclosed for establishing a persistent two-way connection between client and server and then switching to a nonpersistent connection (e.g., an AJAX or AJAX-style connection) when a device parameter meets a criterion (e.g., a device battery level falls below a threshold). When the nonpersistent connections are used, the client can monitor server-based data transmissions via polling, as was traditionally performed, but the polling period can be reduced to a sufficient extent to trigger Fast Dormancy or other power saving methods of the device.

Figure 2:
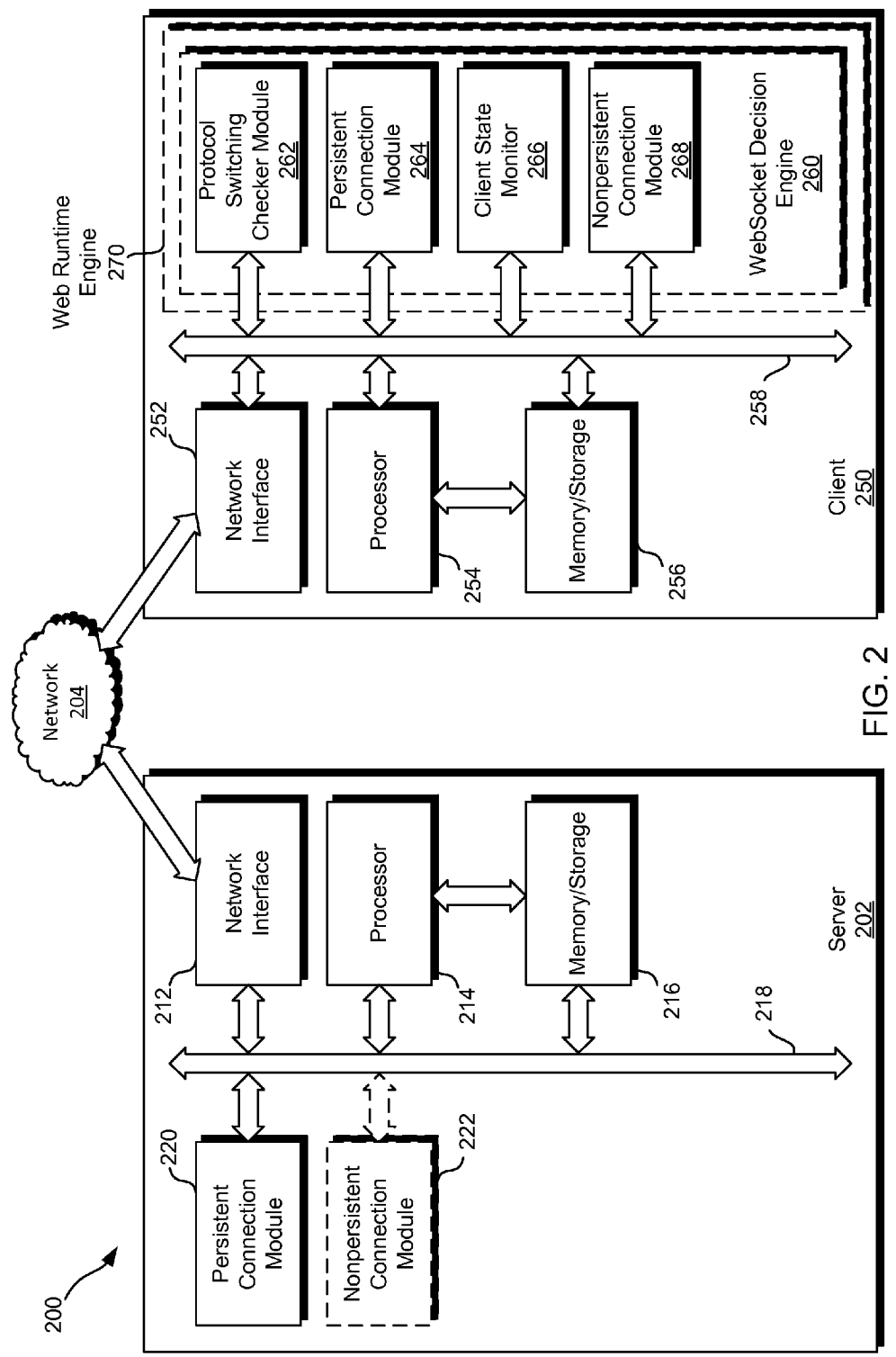
FIG. 2 illustrates a client-server system where the client is configured for persistent and nonpersistent communication.

A method for switching between a persistent and nonpersistent communication protocol is illustrated in FIG. 1. A client and server configuration for carrying out portions of the method of FIG. 1 is illustrated in FIG. 2.

FIG. 1 illustrates a method for client-server communication wherein a persistent or nonpersistent connection can be used. The method 100 includes an establish operation 102 that establishes a persistent two-way connection between a client and a server. The method 100 then determines if the server is capable of, or configured to, switch between persistent and nonpersistent communication protocols in a decision 104. If the server is not capable of such a switch, then the persistent two-way connection can continue to be used and operated via traditional methods in continue operation 106 and the method 100 ends. However, if the server is able to switch to the nonpersistent two-way communication protocol, then a first monitoring operation 108 can monitor a battery, or some other parameter, of the client. A second decision 110 can determine whether the monitored parameter meets a first criterion, such as a battery level falling below a low battery threshold.

If this criterion is met, the persistent two-way connection can be terminated (or partially terminated in some cases) and one or more nonpersistent connections can be established in a terminate operation 112. A second monitor client parameter operation 114 can monitor the client parameter until a third decision 116 determines that the parameter meets a second criterion. For instance, a parameter may meet the second criterion if the battery level rises back above the low battery threshold. When, or if, this occurs, the method 100 can reestablish the persistent two-way connection between the client and server via a reestablish operation 118. In the case of the terminate operation 112 including a partial termination, a portion of the persistent connection (e.g., a WebSocket object) can help facilitate the reestablishment of the persistent connection in reestablish operation 118. The method 100 then returns to the first monitor operation 108 and begins looping from there until communication is complete.

The establish persistent two-way connection operation 102 can be established and operated via an API of an operating system (OS), or in an alternative embodiment, via the WebSocket protocol. It can include a handshake between client and server. A handshake is a process whereby the client and server share and agree upon parameters for a connection. In many cases, persistent communication can be assumed, and thus a persistent connection protocol can be the default implementation. In other cases, the handshake may include data indicating that the connection should be persistent, for instance via data in a header of a data packet sent from the client to the server.

The method 100 assumes that the client and server are both capable of persistent communication, but only assumes that the client is necessarily able to operate on nonpersistent connections, such as AJAX connections. Hence the need for the first decision 104, which determines whether the server is also able to operate on nonpersistent connections and thus whether the server can switch to a nonpersistent protocol should the need arise.

In one embodiment, the decision 104 can look for a data indicator in a header of a handshake request indicating a client's desire or request to engage in communication that may switch between persistent and nonpersistent protocols. In such an instance, the decision 104 may actually take place before or in parallel to the establish operation 102.

The parameter that is monitored in the first and second monitor operations 108 and 114 can include a battery state or a modem state of a mobile device to name two examples. In the case of a battery state, a battery API may be used by a web browser of the client to access and monitor the battery state. The mobile device or client device, such as a tablet computer or smartphone, to name two examples, can carry out one or more of the operations in FIG. 1, and is illustrated in FIG. 2.

In the case of monitoring a battery state, a web browser client may have access to a value indicative of device battery power and can therefore monitor device battery power and perform the monitoring operations 108 and 114. In the case of modem state, for instance, the switch to nonpersistent connections may be triggered by the modem state shifting from a WIFI to a cellular network—a situation in which reduced power consumption may be desirable. In one embodiment, a location of the device can, via implication, indicate the type of wireless network being used, and thus while the end goal is to monitor the modem state, the directly monitored parameter may be location. For instance, when a mobile device is within a user's home with a known WIFI network, this location can be indicative of the device using the WIFI network. When the mobile device leaves the home, this may imply that the device has switched to a 3G or 4G cellular network, and thus a switch to a nonpersistent protocol may be triggered.

The nonpersistent connections of operation 112 are established and torn down each time that the client communicates with the server. In order to account for instances where the server has data to send to the client, the client can periodically poll the server to check for waiting data, and if the server has waiting data, then a nonpersistent connection can be established to allow the server to transmit the data to the client. Nonpersistent connections can be AJAX connections or other nonpersistent connections.

Were the creation and tear down of nonpersistent connections repeated in rapid succession, the device would not be able to enter an idle, dormant, or other power saving mode and battery power would continue to rapidly diminish despite the switch from a persistent connection. However, in this disclosure, a period for the establishment of nonpersistent connections is selected so as to be long enough to enable triggering of Fast Dormancy or other power saving modes, thus conserving battery power as compared to times when a persistent connection exists. In this way, the switch to nonpersistent connections reduces battery consumption. As such, developers can continue to use their home-grown keep-alive mechanisms with WebSockets and other persistent connection protocols, and the system will automatically disable the persistent connection and switch to using low-frequency nonpersistent connections when the battery runs low or some other parameter indicates a preference for nonpersistent connections to be made. This method is also invisible to developers and thus easy to push to a large number of devices and operating systems.

Determining a period for nonpersistent connections that is long enough to enable triggering of Fast Dormancy or other power saving modes may be based on a known period or on observation of the device to determine the period. For instance, during runtime through an API, one can determine a period of time that must elapse for Fast Dormancy to take effect.

Although not illustrated, the method 100 may come to an end when either the client or server tears down the persistent connection or puts an end to nonpersistent connections. For instance, while partaking in a persistent connection, the client can send a CLOSE instruction to the server causing the server to tear down the connection.

FIG. 2 illustrates a client-server system where the client is configured for persistent and nonpersistent communication. The server 202 and the client 250 each include a network interface 212 and 252 respectively, for sending and receiving data via a network 204 such as the Internet. The server 202 and the client 250 each include a processor 214 and 254, respectively, as well as a memory/storage 216, 256 for short and/or long term storage. Each component and module of the server 202 can be in communication via a bus 218 and each component and module of the client 250 can be in communication via a bus 258. Each component and module can therefore send and receive data to and from other components and modules of the server 202 or the client 250 via the respective bus 218, 258. In one embodiment, the server 202 can be a web server and the client 250 can be a web browser.

The client 250 further includes a web runtime engine 270 having a WebSocket decision engine 260. The WebSocket decision engine 260 comprises components and/or modules that control whether the client 250 connects to the server 202 via a persistent or nonpersistent connection. In particular, the WebSocket decision engine 260 can include a protocol switching checker module 262 that determines if the server 202 can support, and switch between, persistent and nonpersistent communication protocols. The WebSocket decision engine 260 also includes a persistent connection module 264 that establishes a persistent two-way connection between the client 250 and the server 202. The WebSocket decision engine 260 further includes a client state monitor 266 that monitors a state of the client and initiates termination of the persistent connection when the state meets a predefined criterion. The WebSocket decision engine 260 also includes a nonpersistent connection module 268 that establishes at least one nonpersistent two-way connection between the client and the server once the persistent two-way connection has been terminated.

The protocol switching checker module 262 can send data to the server 202 that elicits a response indicating whether the server 202 can partake in nonpersistent communication as well as persistent communication. In one embodiment, this can include appending a nonpersistent data indicator in a header of a handshake message sent to the server 202. The protocol switching checker module 262 may also check a response from the server 202, such as a handshake response, to see if there is indication that the server 202 can partake in both nonpersistent and persistent communications. The protocol switching checker module 262 also provides an indicator to other parts of the WebSocket decision engine 260 indicating the result of this query.

The persistent connection module 264 is configured to establish and carry out persistent communication with a persistent connection module 220 of the server 202. For instance, the persistent connection module 264 can establish a WebSocket connection to the server 202 and pass and receive messages to and from the server 202. The persistent connection module 264 operates regardless as to the results determined at the protocol switching checker module 262. The persistent connection module 264, or the persistent connection module 220, can also tear down a persistent connection when the client state monitor 266 determines that a parameter or other criterion has been met (e.g., a low battery power level). If the parameter meets a second criterion (e.g., the battery level rises above a threshold), then the persistent connection module 264 can reestablish the persistent connection with the server 202.

Tearing down of the persistent connection can involve partial closing of the connection. Partial closing can involve a termination of a TCP connection between the client 250 and the server 202, but may not affect an instantiation of a WebSocket object. In one embodiment, the persistent connection module 264 can close a TCP connection between the client 250 and the server 202 while not informing a web application running on the web runtime engine 270 that the TCP connection has closed. Instead, the web application continues to operate and make requests to the server 202 and receive data from the server 202 via a non-persistent connection. When the persistent connection module 264 reestablishes the persistent connection, the change in communication protocols will be unknown to the web application, and the web application will continue operating as if nothing changed. Alternatively, the persistent connection module 220 can close the TCP connection between the client 250 and the server 202 and the persistent connection module 264 may not inform the web application running on the web runtime engine 270 that the TCP connection has been closed.

The client state monitor 266 can monitor states such as a battery state (e.g., battery power level) or a modem state or type (e.g., WIFI v. cellular v. LAN), to name two non-limiting examples, as they relate to criteria such as a battery power level threshold. Further examples of client states include device networking stack limits and sudden TCP termination due to intermediary proxies. In one embodiment, the client state monitor 266 can have access to hardware data not accessible to an applications layer of an abstraction stack.

If the client state monitor 266 determines that a parameter meets a criterion that results in a tear down of the persistent connection, then the nonpersistent connection module 268 can establish a series of one or more nonpersistent connections with the server 202 and can send and receive messages to and from the server 202 via these nonpersistent connections. For instance, the nonpersistent connection module 268 can implement AJAX or AJAX-style connections with the server 202 in one embodiment. The nonpersistent connection module 268 can further make one or more XMLHTTPRequests (XHR) to the server 202, and these requests can be periodic. XHR is an API available in web browser scripting languages such as JavaScript. XHR can involve the sending of HTTP or HTTPS requests directly to the server 202 along with a loading of a response from the server 202 directly back into a script of the XHR.

The nonpersistent connection module 268 may also poll the server 202 to identify data that the server 202 wishes to send to the client 250 and subsequently open a nonpersistent connection to enable such transmissions. The nonpersistent connection module 268 can also stop establishing nonpersistent connections if the client state monitor 266 determines that the parameter meets a second criterion and hence a return to a persistent connection is appropriate.

In some embodiments, the second criterion can be the same as the first criterion. For instance, in the case of a battery level threshold, the first and second criteria can be the same—a switch to nonpersistent connections is made when the battery level falls below the threshold and a switch to a persistent connection is made when the battery level rises above the threshold.

The client state monitor 266 will typically not be needed and will typically not operate if the protocol switching checker module 262 determines that the server 202 cannot engage in nonpersistent communications. The WebSocket decision engine 260 is not required in order for the modules 262, 264, 266, and 268 to exist and operate, but when implemented, the WebSocket decision engine 260 can be a part of WebSocket and optionally part of the web runtime engine 270. Alternatively, the modules 262, 264, 266, and 268 can be controlled by JavaScript. The modules 262, 264, 266, and 268 are not limited to implementation in any particular layer or level of the software stack abstraction. In some cases, the modules 262, 264, 266, and 268 can be implemented at one or more levels of the stack. For instance, they can be implemented in part at the application layer and in part at the network layer or entirely in an OS layer, to name two non-limiting examples.

Because the modules 262, 264, 266, and 268 are implemented at the WebSocket runtime engine level they have access to modem and other hardware information and states that would not be available if these modules 262, 264, 266, and 268 were implemented in JavaScript. For instance, the client state monitor 266 can have access to a time parameter that the client 250 uses as a threshold for engaging Fast Dormancy.

The server 202 further includes a persistent connection module 220 and sometimes includes a nonpersistent connection module 222. The server 202 can receive a connection request from the client 250 via the network 204 and the network interface 212. The server can then determine whether the client 250 is requesting nonpersistent as well as persistent connections. In one embodiment, said information may be included in a header of a data packet that the client 250 sends to the server 202. If the client 250 requests only persistent communications, as is done in the art, then the server 202 can continue with the communication since it always has a persistent connection module 220 for handling persistent connections. However, if the client 250 is also requesting nonpersistent connections, then the server 202 may determine if it includes a nonpersistent connection module 222 or some other means of handling nonpersistent connections. Alternatively the client 250 can query the server 202 and determine if the server 202 is capable of persistent and nonpersistent connections.

If the server 202 in question does not include the nonpersistent connection module 222, then the server 202 can refuse to engage in the proposed communication with the client 250, suggest that only persistent connections be used, return an error message (e.g., "Bad Request" HTTP code 400), or ignore the nonpersistent aspect of the request and operate as if the client 250 had requested only a persistent connection. However, if the server 202 in question includes the optional nonpersistent connection module 222, then the server 202 can return a response to the client 250 acknowledging that the server 202 can engage in both nonpersistent and persistent communication.

The persistent connection module 220 and the persistent connection module 264 then establish a persistent connection between them and begin sending messages to each other. If the client 250 decides that a nonpersistent connection is desired, for example because the client 250 battery power level falls below a threshold, then the client 250 may request a switch to nonpersistent communications. The persistent connection can be torn down (or partially torn down) and the server's 202 nonpersistent connection module 222 can take over communications for the server 202. The nonpersistent connection module 222 can listen for a request for nonpersistent communication from the client 250 (e.g., an XHR). When such a request is received, the nonpersistent connection module 222 can communicate with the client 250 via one or more nonpersistent connections. If the client 250 determines that communications can return to a persistent protocol, then the server 202 can end nonpersistent communications and reestablish the persistent connection with the persistent connection module 220.

The network 204 can include a wired or wireless network or a combination of the two. It can include the Internet, a cellular network, or a combination of the two. The network 240 can include a wide area network (WAN), a local area network (LAN), or a combination of the two. The WebSocket decision engine 260 and/or the modules 262, 264, 266, and 268 can reside in the memory/storage 256 and operate on the processor 254. They can also interact with the server 202 via the network 204. The modules 220 and 222 can reside in the memory/storage 216 and operate on the processor 214. They can also interact with the client 250 via the network 204.

The processors 214 and 254 can include one or more components such as one or more cores and one or more caches. These components can be integrated onto a single die or into a single package or may comprise multiple interconnected packages.

The memory/storage 216 and 256 can comprise RAM and possibly virtual memory of a harddrive. In other embodiments, the memory/storage 216 can include cache on the processor 214 and the memory/storage 256 can include cache on the processor 254. The memory/storage 216 and 256 can include direct communication paths with their respective processors 214 and 254 as illustrated. The memory/storage 216 can also communicate with any other component on the server 202 via the bus 218 and the memory/storage 256 can communicate with any other component on the client 250 via the bus 258.

In non-illustrated embodiments, the web runtime engine 270 and the WebSocket decision engine 260 can be removed, and instead the modules 262, 264, and 268 may be part of an API or built into an operating system (OS). The client state monitor 266 can be part of the API or part of an OS. The OS may also be configured to switch communication between the client 250 and the server 202 from persistent to nonpersistent connections and back. If an API is used, then the API can remain open when the persistent connection is closed thus facilitating reestablishment of the persistent connection at a later time.

The server 202 and client 250 can include various other modules and components that are not illustrated such as display drivers, input means, and removable storage, to name a few non-limiting examples. Some of these components are discussed with reference to the computing system of FIG. 4.

Figure 3:
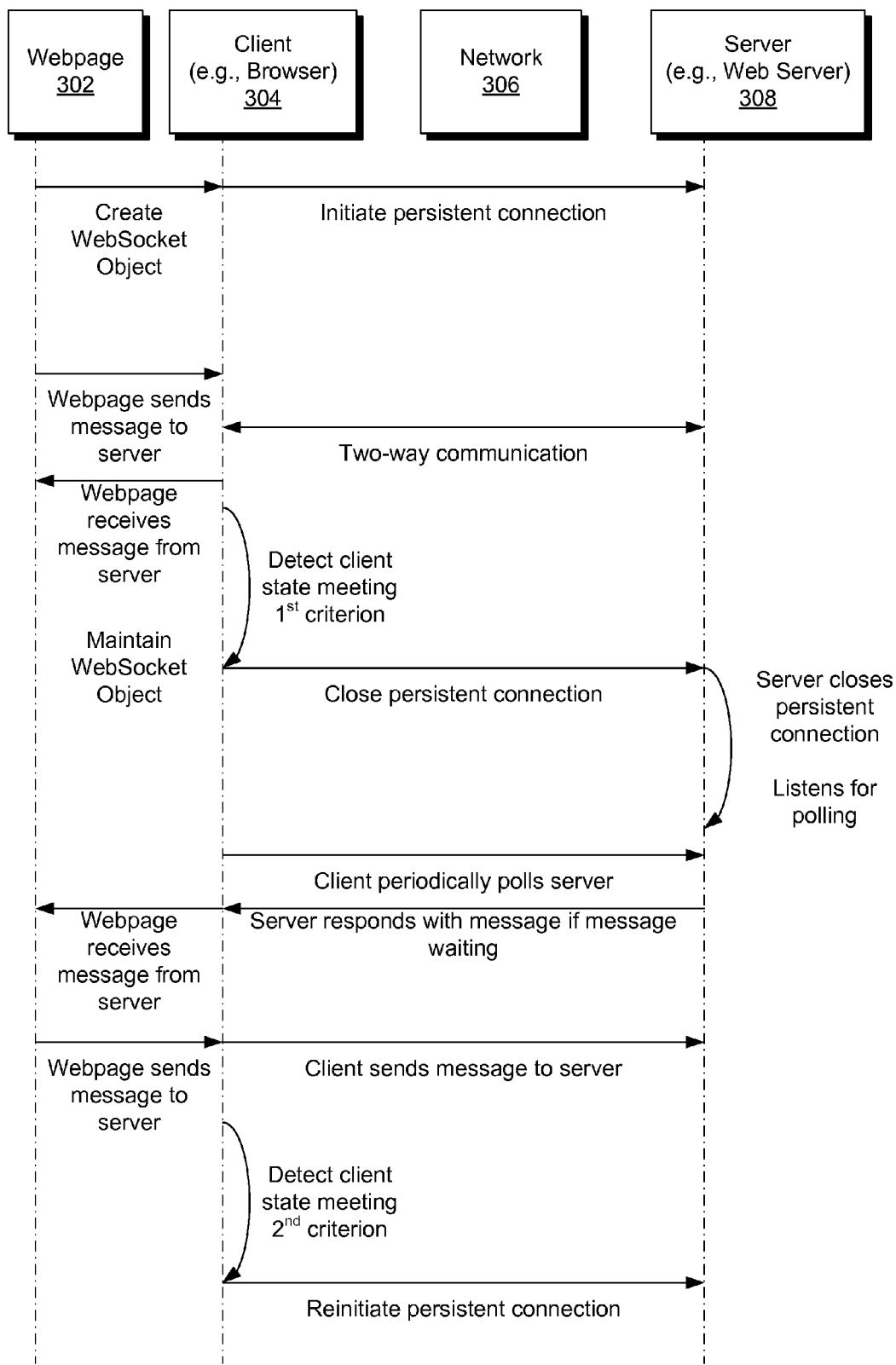
FIG. 3 illustrates a flow chart of client-server communications according to one embodiment of this disclosure.

FIG. 3 illustrates a flow chart of client-server communications according to one embodiment of this disclosure. The client 304 and server 308 can engage in persistent communication by the following: (1) creating a WebSocket object in JavaScript; (2) initiating a persistent connection via a network 306; (3) exchanging one or more messages in two-way communication between the client 304 and the server 308; and (4) tearing down the persistent connection, but maintaining the WebSocket object when a client 304 state meets a criterion (e.g., a low battery level). During the two-way communication, the webpage 302 can send one or more messages to the server via the client 304 and receive one or more messages from the server via the client 304. The tearing down can be initiated by the server 308, the client 304, or can be an automatic result of a timeout timer expiring due to inactivity on the connection. Despite the server 308 tearing down the persistent connection, the client 304 maintains the WebSocket object so that the persistent connection can be reestablished at a later time without discontinuity to the user experience. Only when communications are completed is the WebSocket object also closed. In the art, the WebSocket object is also closed when the persistent connection is terminated.

The client 304 and server 308 can also engage in nonpersistent communication by the following: (1) the server 308 can listen for polling from the client 304; (2) the client 304 can periodically poll the server 308; and (3) the server 308 can respond to the polling with a message for the client 304 that was waiting for the client 304, assuming there was a waiting message, and the webpage 302 can receive the message from the client 304. Alternatively to (3), the webpage 302 can send a message to the server 308 via the client 304 and the network 306. Either of a server's 308 response to client 304 polling or a client's 304 sending of a message to the server 308, can occur on each nonpersistent connection established between the client 304 and the server 308.

If the client 304 state meets a second criterion (e.g., battery power rises back above a battery power threshold), then the nonpersistent connections can stop being used and the persistent connection can be reestablished using the existing WebSocket object. The session identification provided by the client 304 can be used to maintain continuity during the switch of connection protocols. In some embodiments, the first and second criteria are the same.

In some embodiments, the persistent connection can be a TCP connection. In some embodiments, the client state can be a battery state or a type of network 306 on which communications are taking place. In some embodiments, initiation of the persistent connection can include negotiating continuity of a nonpersistent connection so that the client 304 and server 308 are ready to switch between persistent and nonpersistent connections. Negotiating continuity of the nonpersistent connection can include determining if the server 308 is able to engage in both persistent and nonpersistent connections. If it cannot, the negotiation of continuity of the nonpersistent connection fails. The initiation of the persistent connection may further involve assigning a session identification to the persistent connection. The server 308 can then pass the session identification to the client 304 upon termination of the persistent connection, which the client 304 can then use when establishing the one or more nonpersistent connections to enable the server 308 to know that the nonpersistent connections are to be continuations of communication via the persistent connection.

In some embodiments, the polling from the client 304 can be in the form of periodic nonpersistent requests to the server 308. For instance, such requests can be XMLHTTPRequests (XHR). In instances, where the client 304 sends a message to the server 308, the XHR can include the message. In some embodiments, the client 304 can be a web browser and the server 308 can be a web server.

Figure 4:
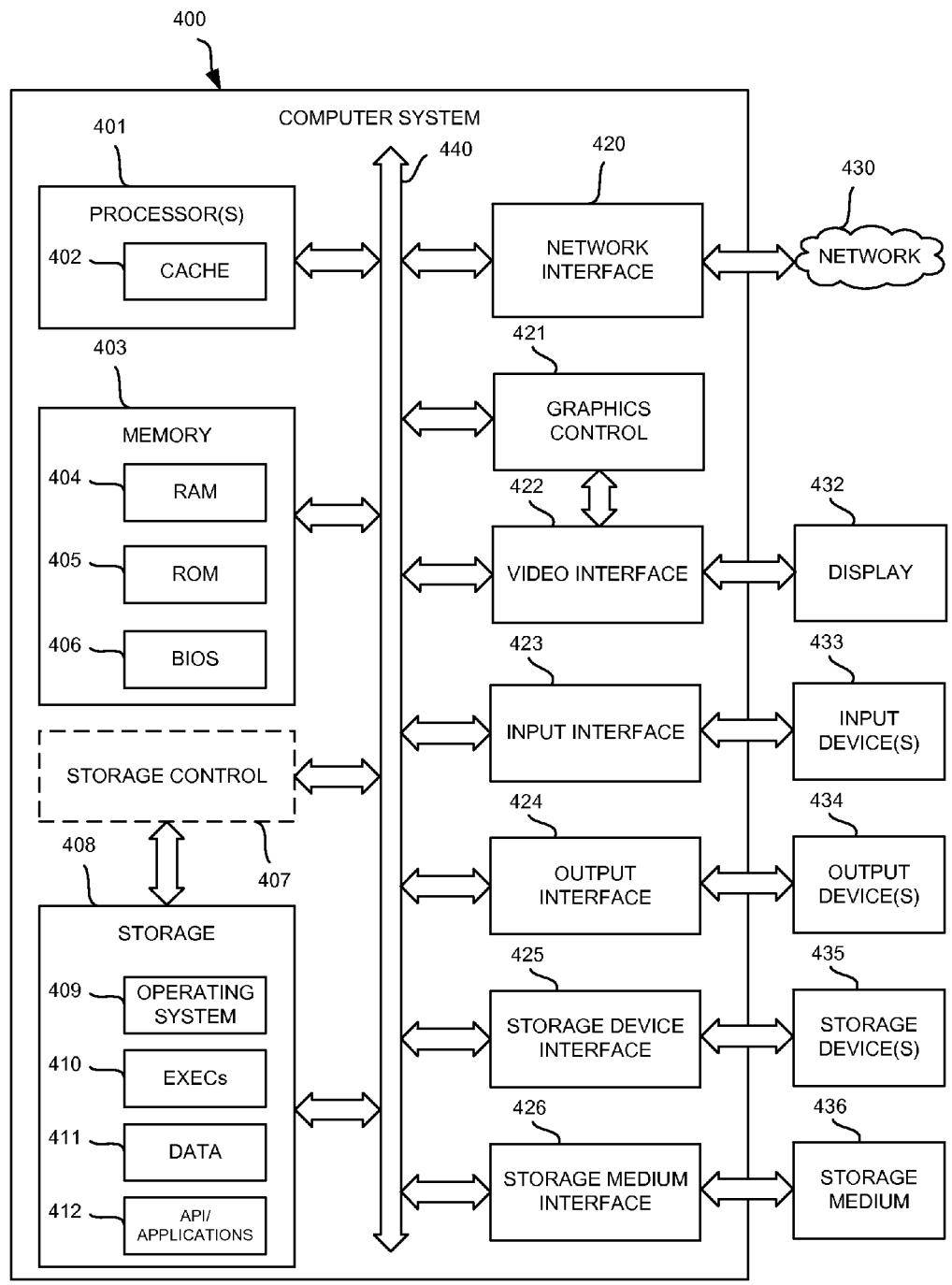
FIG. 4 shows a diagrammatic representation of one embodiment of a machine in the exemplary form of a computer system.

The systems and methods described herein can be implemented in a machine such as a computer system in addition to the specific physical devices described herein. FIG. 4 shows a diagrammatic representation of one embodiment of a machine in the exemplary form of a computer system 400 within which a set of instructions can execute for causing a device to perform or execute any one or more of the aspects and/or methodologies of the present disclosure. The components in FIG. 4 are examples only and do not limit the scope of use or functionality of any hardware, software, embedded logic component, or a combination of two or more such components implementing particular embodiments.

Computer system 400 may include a processor 401 (e.g., processors 214 and 254), a memory 403 (e.g., memories 216 and 256), and a storage 408 (e.g., storage 216 and 256) that communicate with each other, and with other components, via a bus 440. The bus 440 (e.g., bus 218 or 258) may also link a display 432, one or more input devices 433 (which may, for example, include a keypad, a keyboard, a mouse, a stylus, etc.), one or more output devices 434, one or more storage devices 435, and various tangible storage media 436 (e.g., memory/storage 216 and 256). All of these elements may interface directly or via one or more interfaces or adaptors to the bus 440. For instance, the various tangible storage media 436 can interface with the bus 440 via storage medium interface 426. Computer system 400 may have any suitable physical form, including but not limited to one or more integrated circuits (ICs), printed circuit boards (PCBs), mobile handheld devices (such as smartphones and tablet computers), laptop or notebook computers, distributed computer systems, computing grids, or servers.

Processor(s) 401 (or central processing unit(s) (CPU(s))) optionally contains a cache memory unit 402 for temporary local storage of instructions, data, or computer addresses. Processor(s) 401 are configured to assist in execution of computer readable instructions. Computer system 400 may provide functionality as a result of the processor(s) 401 executing software embodied in one or more tangible computer-readable storage media, such as memory 403, storage 408, storage devices 435, and/or storage medium 436. The computer-readable media may store software that implements particular embodiments (e.g., the method 100 illustrated in FIG. 1), and processor(s) 401 may execute the software. Memory 403 may read the software from one or more other computer-readable media (such as mass storage device(s) 435, 436) or from one or more other sources through a suitable interface, such as network interface 420. The software may cause processor(s) 401 to carry out one or more processes or one or more steps of one or more processes described or illustrated herein (e.g., the method 100 illustrated in FIG. 1). Carrying out such processes or steps may include defining data structures stored in memory 403 and modifying the data structures as directed by the software.

The memory 403 may include various components (e.g., machine readable media) including, but not limited to, a random access memory component (e.g., RAM 404) (e.g., a static RAM "SRAM", a dynamic RAM "DRAM, etc.), a read-only component (e.g., ROM 405), and any combinations thereof. ROM 405 may act to communicate data and instructions unidirectionally to processor(s) 401, and RAM 404 may act to communicate data and instructions bidirectionally with processor(s) 401. ROM 405 and RAM 404 may include any suitable tangible computer-readable media described below. In one example, a basic input/output system 406 (BIOS), including basic routines that help to transfer information between elements within computer system 400, such as during start-up, may be stored in the memory 403.

Fixed storage 408 is connected bidirectionally to processor(s) 401, optionally through storage control unit 407. Fixed storage 408 provides additional data storage capacity and may also include any suitable tangible computer-readable media described herein. Storage 408 may be used to store operating system 409, EXECs 410 (executables), data 411, API applications 412 (application programs), and the like. Often, although not always, storage 408 is a secondary storage medium (such as a hard disk) that is slower than primary storage (e.g., memory 403). Storage 408 can also include an optical disk drive, a solid-state memory device (e.g., flash-based systems), or a combination of any of the above. Information in storage 408 may, in appropriate cases, be incorporated as virtual memory in memory 403.

In one example, storage device(s) 435 may be removably interfaced with computer system 400 (e.g., via an external port connector (not shown)) via a storage device interface 425. Particularly, storage device(s) 435 and an associated machine-readable medium may provide nonvolatile and/or volatile storage of machine-readable instructions, data structures, program modules, and/or other data for the computer system 400. In one example, software may reside, completely or partially, within a machine-readable medium on storage device(s) 435. In another example, software may reside, completely or partially, within processor(s) 401.

Bus 440 connects a wide variety of subsystems. Herein, reference to a bus may encompass one or more digital signal lines serving a common function, where appropriate. Bus 440 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 400 may also include an input device 433. In one example, a user of computer system 400 may enter commands and/or other information into computer system 400 via input device(s) 433. Examples of an input device(s) 433 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 433 may be interfaced to bus 440 via any of a variety of input interfaces 423 (e.g., input interface 423) including, but not limited to, serial, parallel, game port, USB, FIREWIRE, THUNDERBOLT, or any combination of the above.

In particular embodiments, when computer system 400 is connected to network 430, computer system 400 may communicate with other devices, specifically mobile devices and enterprise systems, connected to network 430 (e.g., network 204). Communications to and from computer system 400 may be sent through network interface 420 (e.g., network interfaces 212 and 252). For example, network interface 420 may receive incoming communications (such as requests or responses from other devices) in the form of one or more packets (such as Internet Protocol (IP) packets) from network 430, and computer system 400 may store the incoming communications in memory 403 for processing. Computer system 400 may similarly store outgoing communications (such as requests or responses to other devices) in the form of one or more packets in memory 403 and communicated to network 430 from network interface 420. Processor(s) 401 may access these communication packets stored in memory 403 for processing.

Examples of the network interface 420 include, but are not limited to, a network interface card, a modem, and any combination thereof. Examples of a network 430 or network segment 430 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 430, may employ a wired and/or a wireless mode of communication. In general, any network topology may be used.

Information and data can be displayed through a display 432. Examples of a display 432 include, but are not limited to, a liquid crystal display (LCD), an organic liquid crystal display (OLED), a cathode ray tube (CRT), a plasma display, and any combinations thereof. The display 432 can interface to the processor(s) 401, memory 403, and fixed storage 408, as well as other devices, such as input device(s) 433, via the bus 440. The display 432 is linked to the bus 440 via a video interface 422, and transport of data between the display 432 and the bus 440 can be controlled via the graphics control 421.

In addition to a display 432, computer system 400 may include one or more other peripheral output devices 434 including, but not limited to, an audio speaker, a printer, and any combinations thereof. Such peripheral output devices may be connected to the bus 440 via an output interface 424. Examples of an output interface 424 include, but are not limited to, a serial port, a parallel connection, a USB port, a FIREWIRE port, a THUNDERBOLT port, and any combinations thereof.

In addition or as an alternative, computer system 400 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for switching between a persistent communication protocol between a client and a server and a nonpersistent communication protocol between the client and the server, the method comprising:
    establishing a persistent connection between the client and the server;
    determining that the server can switch between the persistent and the nonpersistent communication protocols;
    monitoring a battery of the client;
    when a power level of the battery falls below a first threshold, terminating the persistent connection; and
    initiating one or more nonpersistent connections between the client and the server;
    wherein the persistent connection is a WebSockets connection, the WebSocket connection comprising a WebSocket object that remains open when the persistent connection is terminated and the one or more nonpersistent connections are initiated.

2. The method of claim 1, further comprising monitoring the battery of the client after the initiating, and when the power of the battery rises above a second threshold, reestablishing the persistent connection.

3. The method of claim 1, further comprising polling the server to determine if there is data at the server waiting for the client, and initiating another nonpersistent connection between the client and the server in order to receive the data from the server.

4. The method of claim 1, wherein each of the one or more nonpersistent connections is an Asynchronous JavaScript and XML (AJAX) connection.

5. The method of claim 1, wherein the one or more nonpersistent connections are periodically established, and where the period enables the client to enter a power saving mode.

6. The method of claim 5, wherein the power saving mode is a dormancy state.

7. The method of claim 1, wherein the persistent connection is implemented via an API.

8. The method of claim 1, wherein a radio of the client is active less often when communicating via the one or more nonpersistent connections than when communicating via the persistent connection, thus conserving battery power.

9. The method of claim 1, wherein the terminating of the persistent connection is a partial tearing down of the persistent connection.

10. The method of claim 9, wherein a WebSocket object persists while the persistent connection is terminated, the WebSocket object facilitating reestablishment of the persistent connection at a later time.

11. A client hardware device configured to partake in a communication connection with a server, the client comprising a non-transitory memory comprising:
 a protocol switching checker module that determines if the server can support, and switch between, persistent and nonpersistent communication protocols;
 a persistent connection module that establishes a persistent connection between the client and the server;
 a client state monitor that monitors a state of the client and initiates termination of the persistent connection when the state meets a predefined criterion; and
 a nonpersistent connection module that establishes at least one nonpersistent connection between the client and the server once the state meets the predefined criterion;
 wherein the persistent connection is a WebSockets connection; and
 wherein a WebSocket object of the WebSockets connection remains open when the persistent connection is switched to the one or more nonpersistent connections.

12. The client of claim 11, wherein the state is a battery state.

13. The client of claim 12, wherein the predefined criterion is a battery power threshold.

14. The client of claim 11, wherein the state is a modem state.

15. The client of claim 14, wherein the predefined criterion is a change of the modem state from operating via a first network type to operating via a second network type.

16. The client of claim 11, wherein the persistent connection module is part of an operating system.

17. The client of claim 16, wherein the persistent connection module is part of an API of the operating system.

18. The client of claim 17, wherein the API remains open when the state meets the predefined criterion and the persistent connection is switched to the one or more nonpersistent connections.

19. The client of claim 11, where the client state monitor is part of a web runtime engine.

20. The client of claim 11, wherein the client state monitor accesses hardware data that is not accessible to an application layer of an abstraction stack.

21. A websocket decision engine of a web runtime engine of a client comprising:
 a means for establishing a persistent connection with a server;
 a means for monitoring a state of the client;
 a means for terminating the persistent connection when the state of the client meets a predefined criterion; and
 a means for replacing the persistent connection with a nonpersistent connection subsequent to the state of the client meeting the predefined criterion;
 wherein the websocket decision engine further maintains a JavaScript WebSocket object associated with the persistent connection after termination of the persistent connection.

22. The web runtime engine of claim 21, wherein the state of the client is a battery level.

23. The web runtime engine of claim 21, wherein the state of the client is a modem state.

24. The web runtime engine of claim 21, wherein the terminating of the persistent connection is performed without informing a web application of the termination, where the web application runs on the web runtime engine.

25. A non-transitory, tangible computer readable storage medium of a server, encoded with processor readable instructions to perform a method for carrying out communication between a client and the server, the method comprising:
 receiving a connection request from a client including a query as to whether the server is able to engage in nonpersistent as well as persistent connections;
 returning a response to the client acknowledging that the server can engage in both nonpersistent and persistent connections;
 engaging in persistent communication with the client via a persistent connection;
 listening for a request for nonpersistent communication from the client once the persistent communication ends;
 receiving the request for nonpersistent communication from the client; and
 engaging in nonpersistent communication with the client;
 maintaining a JavaScript WebSocket object associated with the persistent connection after termination of the persistent connection.

26. The non-transitory, tangible computer readable storage medium of claim 25, wherein the server retains a session identification associated with the persistent connection and uses the session identification to maintain continuity with the nonpersistent communication.

27. The non-transitory, tangible computer readable storage medium of claim 26, wherein the nonpersistent communication involves an AJAX request from the client to the server, and wherein the AJAX request includes a message from the client.

* * * * *